United States Patent
Ryerson et al.

(10) Patent No.: US 7,158,240 B2
(45) Date of Patent: Jan. 2, 2007

(54) MEASUREMENT DEVICE AND METHOD

(75) Inventors: Charles C. Ryerson, Hanover, NH (US); Norbert E. Yankielun, Lebanon, NH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 371 days.

(21) Appl. No.: 10/867,700

(22) Filed: Jun. 16, 2004

(65) Prior Publication Data

US 2005/0280834 A1    Dec. 22, 2005

(51) Int. Cl.
*G01B 11/24* (2006.01)
(52) U.S. Cl. .................. 356/601; 356/503; 356/477; 356/482; 356/485
(58) Field of Classification Search ........... 356/601, 356/503, 477, 482, 485, 486, 319, 328, 496; 250/340
See application file for complete search history.

(56) References Cited

U.S. PATENT DOCUMENTS

| | | | |
|---|---|---|---|
| 3,631,526 A * | 12/1971 | Brunton | 250/339.11 |
| 4,129,781 A * | 12/1978 | Doyle | 250/341.3 |
| 4,259,011 A | 3/1981 | Crumm et al. | |
| 4,461,568 A | 7/1984 | Welbourn et al. | |
| 4,828,387 A * | 5/1989 | Sawyers et al. | 356/319 |
| 4,875,771 A | 10/1989 | Bowley et al. | |
| 5,164,586 A | 11/1992 | Hohberg et al. | |
| 5,196,966 A | 3/1993 | Yamashita | |
| 5,811,824 A | 9/1998 | Smith et al. | |
| 5,835,200 A | 11/1998 | Smith et al. | |
| 6,473,164 B1 | 10/2002 | De Jong et al. | |
| 6,674,533 B1 * | 1/2004 | Price | 356/503 |

* cited by examiner

*Primary Examiner*—Layla G. Lauchman
*Assistant Examiner*—Tri Ton
(74) *Attorney, Agent, or Firm*—Earl H. Baugher, Jr.

(57) ABSTRACT

Apparatus for determining the thickness of a configuration having flat, parallel surfaces that are transparent, or nearly so, to pre-specified types of energy. Embodiments comprise a mechanism for illuminating a front surface with an energy source and mechanisms for measuring reflections of the illumination from a parallel back surface. The energy is contained in a spectrum of wavelengths, the energy being refracted in components at unique wavelengths, e.g., different colored light bands, and similarly reflected from the back surface. The measuring mechanisms, e.g., spectrometers, determine the relative lateral displacement between two spectral lines in the refracted and reflected beams to enable determination of thickness. Other characteristics of the material of the configuration may be ascertained, e.g., chemical composition is ascertained by measuring the intensity of responses at multiple wavelengths and comparing this to responses of known materials.

40 Claims, 5 Drawing Sheets

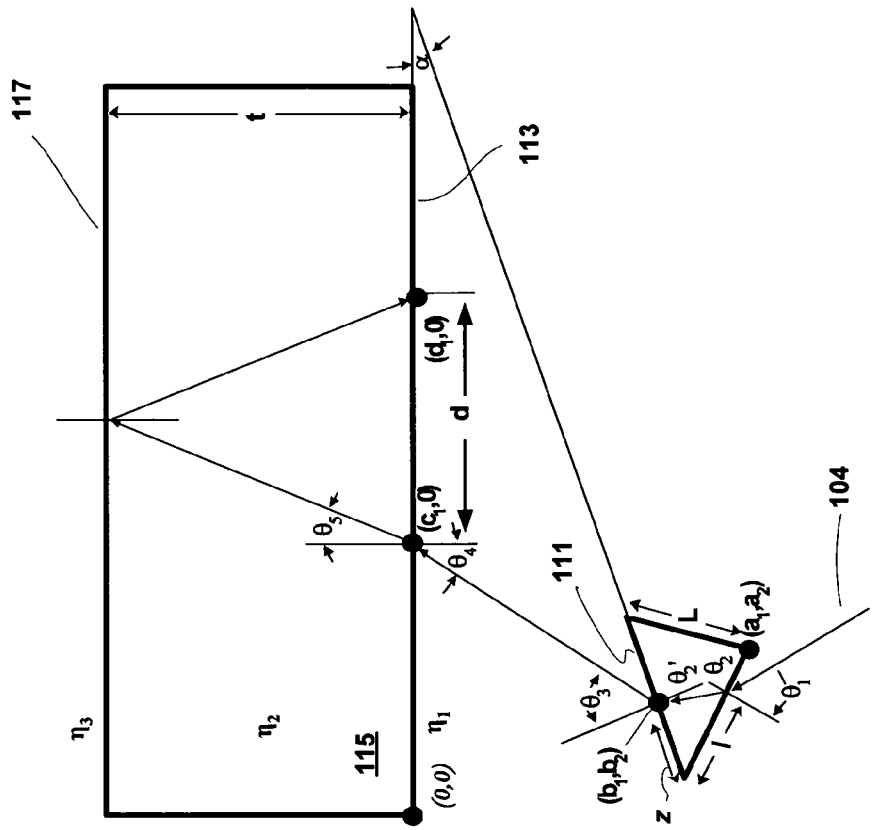
Fig. 2
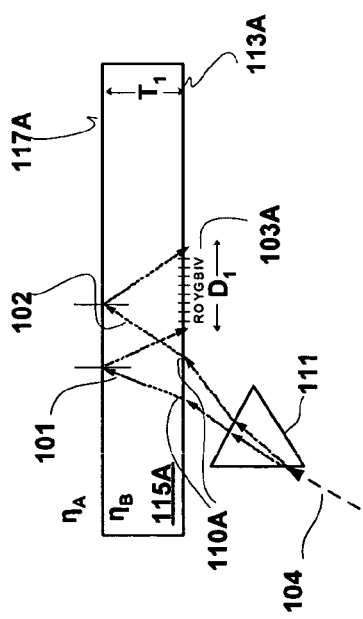
Fig. 1A
Fig. 1B

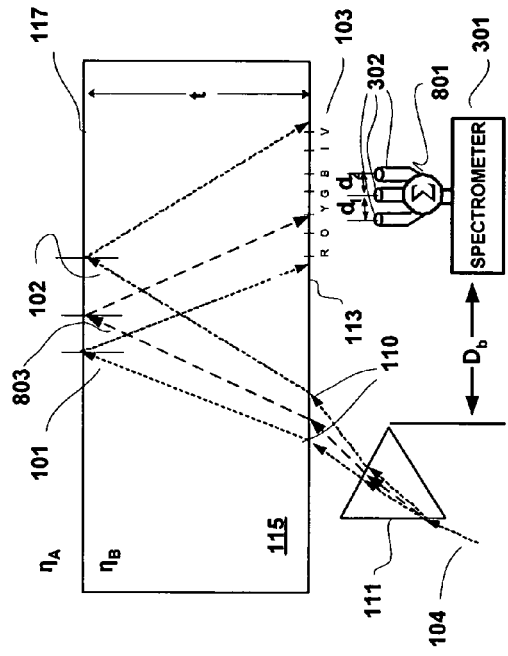
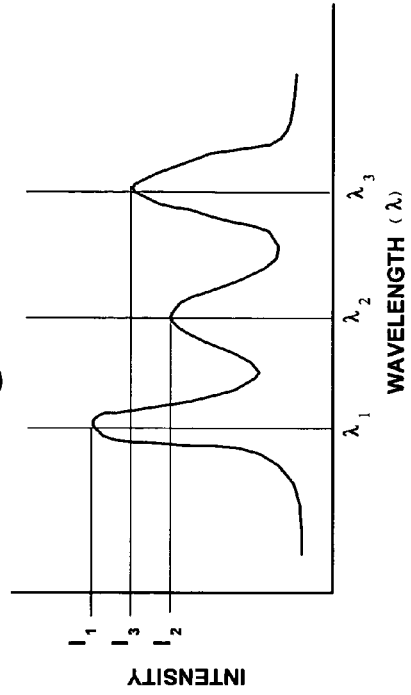
Fig. 8A
Fig. 8B
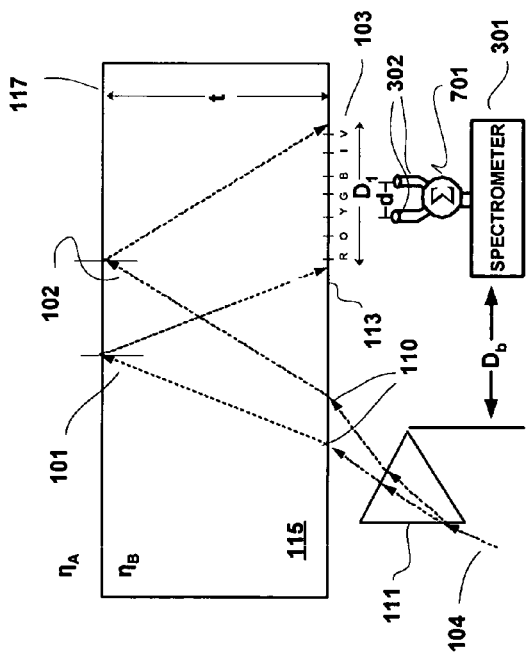
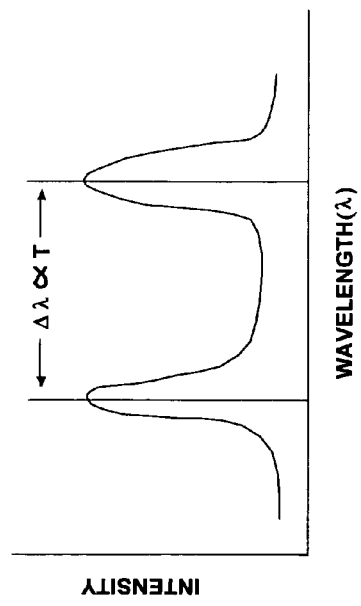
Fig. 7A
Fig. 7B

MEASUREMENT DEVICE AND METHOD

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Sharon Borland at 703 428-9112 or Phillip Stewart at 601 634-4113.

BACKGROUND

Ice accretion on the wings of fixed-wing and on the rotors of rotary-wing aircraft can have disastrous results. The ice that forms on a wing structure, especially along the leading edge, modifies the aerodynamics of the wing, resulting in decreased lift. In the extreme, this can lead to loss of lift and control of the aircraft and potentially a crash. Ice building up elsewhere on the wing and airframe can add significant weight to the aircraft. Several techniques and flight protocols have been developed and are widely used to prevent a plane from becoming ice-covered, both in flight and on the ground.

Some, typically larger, aircraft are equipped with in-flight heaters that melt the ice before it can substantially build up on wings or rotor blades. Protocols have been established for permitting or denying flight under weather conditions or into areas where the potential of aircraft icing is high. On the ground, there are deicing protocols and methods that ensure that there is little to no accretion of ice on wings or rotors immediately prior to flight.

An outstanding problem is that it is difficult while in flight or on the ground to determine when ice is building up on the aircraft until a substantial accretion has taken place. By that time, it may be difficult, or even too late to take evasive maneuvers or rely on the in-flight deicing capability.

On the ground, it would be useful to be able to monitor the state of wing and airframe coverage by deicing fluid, liquid water or the accretion of ice. Availability of this information could be used to decide when to implement deicing procedures with greater efficiency and economy.

BRIEF DESCRIPTION OF DRAWINGS

FIG. 1A depicts the geometrical relationship between thickness and spread of the visible optical spectrum for a configuration at least semi-transparent to visible light and of a first thickness, $T_1$.

FIG. 1B portrays the geometrical relationship between thickness and spread of the visible optical spectrum for a configuration at least semi-transparent to visible light and of a second thickness, $T_2$, where $T_2 > T_1$.

FIG. 2 illustrates the geometric relationship between a prism and a configuration that is at least semi-transparent to a pre-specified type of energy.

FIG. 7A represents a fifth alternative embodiment of the present invention as used to exploit relationships shown in FIG. 1.

FIG. 7B is a plot of the response of the embodiment of FIG. 7A as wavelength vs. light intensity.

FIG. 8A represents a sixth alternative embodiment of the present invention as used to exploit relationships shown in FIG. 1.

FIG. 8B is a plot of the response of the embodiment of FIG. 8A as wavelength vs. light intensity.

DETAILED DESCRIPTION

Figure 3:
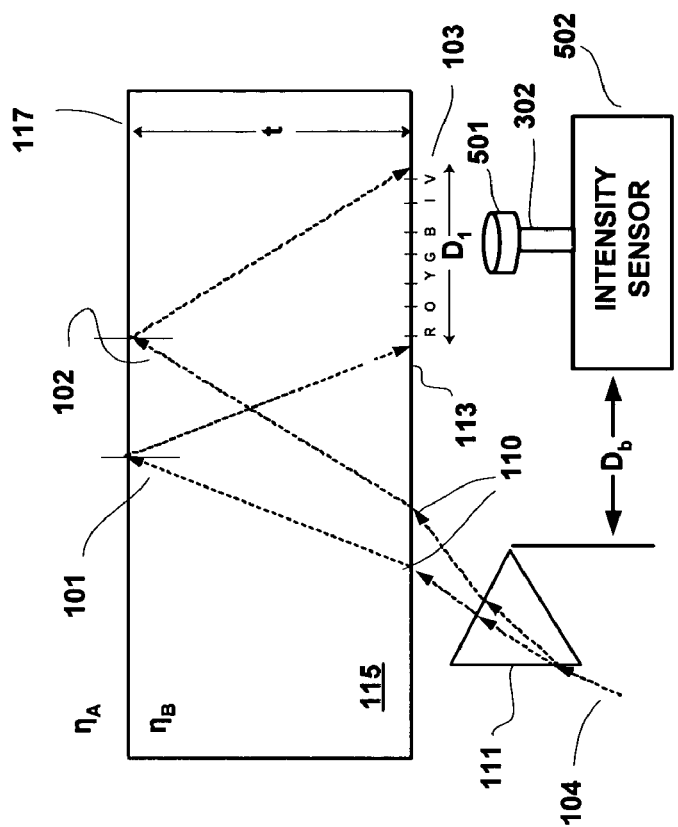
FIG. 3 represents a first alternative embodiment of the present invention as used to exploit relationships shown in FIG. 1.

Apparatus for determining the thickness of a transparent, nearly transparent or semi-transparent configuration having a finite thickness and at least two relatively flat, parallel surfaces. Techniques used in embodiments of the present invention exploit concepts inherent in simple geometric optics, using the wavelength-variable index of refraction that results in the spread of the energy spectrum, e.g., visible light, into the individual wavelengths present therein. For example, select embodiments of the present invention employ the optical spectrum, splitting visible light into individual colors present in certain types of light, such as white light.

In general, an embodiment of the present invention comprises at least one means for illuminating a surface, for illustrative purposes the front (or top) surfaces, of a configuration at least partially transparent to a pre-specified type of energy with a beam of energy, e.g., light, representing at least two distinct wavelengths so that each represented wavelength is refracted at the illuminated (front or top) surface and reflected at the reflected (back or bottom) surface. All surfaces are identified in figures herein in relation to a light source and the position of a prism (positioned near the front or top surface) and any data collection mechanism (positioned near the front or top surface) used in embodiments of the present invention. In actual use, a configuration may be illuminated through a back or bottom surface when viewed with respect to its position in its environment. Describing embodiments with respect to illuminating front and top surfaces is for illustrative purposes in the accompanying drawings only. An embodiment of the present invention also comprises means for measuring at two different wavelengths the relative lateral displacement between beams that have been both refracted and reflected in the configuration of interest. In embodiments of the present invention, this measurement of displacement is made at the surface shown in the included drawings as the front surface. These measurements enable one to infer the thickness of a configuration that is at least partially transparent to the pre-specified energy employed. In select embodiments of the present invention, the illuminating energy is provided as light in a wide continuous beam of "white light," i.e., light containing colors of the visible spectrum.

Embodiments of the present invention include one or more devices for determining parameters of a transparent, nearly transparent or semi-transparent configuration. A device may comprise an illuminator for contacting a first surface of a configuration with pre-specified forms of energy, the energy comprising unique components, each component having at least a unique wavelength. This energy is both refracted from a first surface and reflected from a second surface of the configuration at each of the wavelengths of interest. The device includes a "receiver" that incorporates a "collector" near the first surface to sample the energy that has been both refracted from at least the first surface and reflected from at least the second surface and a "processor" for determining at least one relationship between at least one pair of the unique components. The processor may also determine at least one additional characteristic of the material of the configuration from the refracted/reflected energy components, e.g., at least one of the elements that comprise the material of the configuration. At least one embodiment of the present invention is a device that works when the configuration has first and second surfaces that are approximately flat and parallel one to the other.

One relationship that is determined using embodiments of the present invention is the displacement distance between any two refracted and reflected components. This information may be used to surmise the thickness of the configuration, where thickness may be defined as the distance measured perpendicularly from a first surface to a second surface of the configuration, first and second surfaces being relatively flat and approximately parallel. Embodiments of the present invention may also provide information from which additional parameters of the configuration may be determined, e.g., the chemical composition of the material comprising the configuration. One measurement available from the refracted and reflected energy that may be useful is amplitude. Another is the distance between peaks of responses of any two components.

In embodiments of the present invention the energy that is used comprises light in which at least two different components, each having a different wavelength, are refracted at a first surface and reflected at a second surface. In certain embodiments the light comprises a wide continuous band of light. The light may be in any of the bands of visible light, be white light, ultraviolet light, infrared light, and combinations thereof.

The illuminating source may be one or more light sources and one or more prisms spaced between the light sources and the first surface of the configuration of interest. The light sources may further comprise high-intensity white light sources and one or more optical slits inserted between the high-intensity sources and the prisms, such that the slits focus light from the high-intensity light source at a pre-specified angle on the prisms.

The collector may comprise one or more fiber optic cables, each having a first and second end, the first end disposed near the first surface of the configuration.

The processor processes the collected data to provide one or more measures of interest. In embodiments of the present invention, a processor may comprise one or more optical spectrometers connected to the second end of fiber optic cables used in the embodiments. Embodiments of the present invention may also use one or more monochromatic bandpass filters connected to the first end of the fiber optic cables and to the optical spectrometer via the second end of the fiber optic cable. To facilitate precision location of the collectors, one or more micrometer slide tables may be connected to the first end of the fiber optic cables, such that operating the slide table moves the first end approximately parallel to the first surface of the configuration. To handle large signals, e.g., those that may be encountered when using a high intensity light source, one or more optical attenuators may be inserted between the first and second ends of the fiber optic cables prior to connection to the spectrometer.

In other embodiments of the present invention, one or more light intensity sensors may be substituted for one or more optical spectrometers. In these embodiments, it may be prudent to use at least two monochromatic band-pass filters inserted between the intensity sensor and the slide table, in order to adequately identify wavelengths of interest.

In yet other embodiments of the present invention, one may not wish to use a sliding micrometer, but rather fix the relative position of the collectors, i.e., fiber optic cables. These embodiments foresee two or more fiber optic cables maintained at a fixed separation one from another immediately adjacent thereto. Operation of these embodiments is facilitated via use of one or more optical combiners having two or more inputs, each input connected to a respective second end of the fiber optic cables. Generally, these embodiments are used with one or more optical spectrometers. In a specific embodiment of the above in which thickness or depth is intended as the primary measurement, two fiber optic cables are maintained at a fixed separation one from the other, the first ends of each cable disposed near the first surface of interest and an optical combiner having two inputs is connected to the second end of each fiber optic cable and the combiner is connected to an optical spectrometer for processing the collected data.

Also provided in embodiments of the present invention is a method for measuring the parameters of a configuration that is at least semi-transparent to a pre-specified type of pre-specified energy, the configuration being relatively flat on at least two sides representing two parallel first and second surfaces. In one embodiment, the method comprises: illuminating a first surface, e.g., the front (or top) surface, of a transparent or nearly transparent configuration with a beam of energy, e.g., light, containing at least two distinct wavelengths so that each wavelength is at least refracted at a first surface and at least reflected at a second surface, e.g., the back (or bottom) surface, and measuring at two different wavelengths the relative lateral displacement between two of the refracted and reflected beams of differing wavelengths to infer parameters, e.g., thickness. In select embodiments of the method of the present invention, measuring is done at the first surface. In select embodiments of the method of the present invention, light is provided in a wide continuous beam of white light. Components of the energy, e.g., light of differing wavelengths, may be obtained by passing visible white light through one or more prisms prior to illuminating the first surface.

In embodiments using light, measuring parameters of the configuration is done by: providing one or more fiber optic cables having first and second ends; positioning the first ends near the first surface; providing an optical spectrometer connected to the second ends; and moving the first end laterally along approximately parallel to the first surface, such that moving enables collection of those light components that are refracted and reflected and present at the first surface; and employing the spectrometer to determine parameters, e.g., the displacement distance of the light components, i.e., wavelengths, one from the other.

In other embodiments one or more high-intensity light sources may be employed, together with one or more slits disposed between the high-intensity source and one or more prisms. The slits are illuminated with light from the high-intensity sources and one or more micrometer slide tables connected to the first ends of fiber optic cables enable the movement of the first ends approximately parallel to the first surface. One or more optical attenuators may be connected between the first ends of the fiber optic cables and one or more optical spectrometers. In an alternative embodiment to the above embodiment, one or more intensity sensors may replace the spectrometers but must be used with appropriate monochromatic bandpass filters in a number suitable to provide the desired parameters, e.g., two bandpass filters may provide sufficient information to determine a simple thickness measurement.

In yet other embodiments, two or more fiber optic cables, each having first and second ends, are provided fixed in position relative to any other cable and positioned with first ends near the first surface of the configuration. One or more optical combiners are connected to the second ends and one or more optical spectrometers, respectively. In this embodiment the need for moving the fiber optic cables is eliminated as well as the need for a sliding micrometer table.

Applications of embodiments of the present invention include: in-air sensing of icing conditions of wings and rotors, on-ground sensing of icing conditions of wings and rotors, single-sided thickness measurement of at least semi-transparent fluids, single-sided thickness measurement of at least semi-transparent solids, and measurement of dynamic seawater wash-over or shallow wave depth, in factory quality control of at least semi-transparent product requiring high tolerances, etc. Its application may be extended beyond the visible light spectrum into the infrared and/or ultraviolet wavelengths as well as other energy spectra in which a broadband source capable of separation into distinct wavelengths is used.

Refer to FIG. 1A. In embodiments of the present invention using visible light, a narrow beam of white light 104 focused on the surface of a glass prism 111 is refracted as it passes through the prism 111 and is dispersed into a wide, continuous beam of colored light representative of its component colors such as red (R), orange (O), yellow (Y), green (G), blue (B), indigo (I), and violet (V) as shown at the scale 103A. Upon exiting the prism 111, this "rainbow" beam illuminates, at some range of angles determined by the angular spread of the light spectrum, the first encountered surface 113A (hereafter in this example front) surface of a transparent, nearly transparent, or semi-transparent configuration 115A (e.g., ice, water, glass or PLEXIGLAS™). This configuration 115A preferably has some finite thickness, $T_1$, and relatively flat and parallel surfaces 113A and 117A. Upon entering that configuration, each of the wavelengths of light experiences refraction at an angle of refraction unique to that wavelength. The refracted light propagates through the configuration 115A at angles fixed by wavelength and eventually encounters the second (hereafter in this example bottom) surface or interface 117A. At this interface 117A, the different refractive indices $\eta_A$, $\eta_B$ (e.g., ice to air, glass to air, etc.) cause a reflection of a portion of the light (represented in FIGS. 1A and 1B for simplicity as only two colored light beams of refracted and reflected light 101, 102 of differing wavelengths) such that the incident angle at the interface 117A is identical to the angle of reflection. The reflected light propagates back through the configuration 115A and eventually returns back through the front surface 113A. At exit, the lateral spread of the color spectrum represented by the scale 103A is significantly broader than at the entry point 11A. Refer to FIG. 1B, showing a configuration 115B having a front surface 113B, a back surface (interface) 117B and a thickness, $T_2$, where $T_2 > T_1$. Observing simple geometry in comparing FIGS. 1A and 1B, the greater thickness ($T_2$ vs. $T_1$) of the second configuration 115B results in a greater lateral spread ($D_2$ vs. $D_1$) and a scale 103B that is wider than the scale 103A of FIG. 1A.

Refer to FIG. 2, illustrating the geometric relationship for a single geometric optical ray tracing. To indicate the full angular spread and fully exploit the geometric principle, a multiplicity of rays would represent each of the light wavelength-dependent refractive angles, but a single ray is shown in FIG. 2 to illustrate the principle. The principle is described mathematically by the following equations:

$$\theta_2 = \sin^{-1}\left(\frac{\eta_1}{\eta_2}\sin(\theta_1)\right) \quad (1)$$

$$\theta_2' = 60 - \theta_2 \quad (2)$$

$$\theta_3 = \sin^{-1}\left(\frac{\eta_2}{\eta_1}\sin(\theta_2')\right) \quad (3)$$

$$z = \frac{l}{\left(\frac{\sin(60)}{\sin(90-\theta_2)}\right)\cos(90-\theta_2) + \cos(60)} \quad (4)$$

$$b_1 = a_1 - L\cos(60 - \alpha) + z\cos(\alpha) \quad (5)$$

$$b_2 = a_2 - L\cos(60 - \alpha) + t\sin(\alpha) \quad (6)$$

$$\theta_4 = \theta_3 - \alpha \quad (7)$$

$$c_1 = b_1 - b_2\tan(\theta_4) \quad (8)$$

$$\theta_5 = \sin^{-1}\left(\frac{\eta_1}{\eta_3}\sin(\theta_4)\right) \quad (9)$$

$$d = c_1 + (2t)\tan(\theta_5) \quad (10)$$

where:
($a_1$, $a_2$)=two-dimensional (2D) location of the prism relative to the front surface 113 of the configuration 115,
($b_1$, $b_2$)=2D location of the light beam's exit point from the prism 111 relative to the front surface 113 of the configuration 115,
($c_1$, 0)=2D location of the light beam's entry point from the prism 111 into the front surface 113 of the configuration 115,
($d_1$, 0)=2D location of the light beam's reflection from the back surface 117 at the exit point from the front surface 113 of the configuration 115,
α32 relative 2D orientation angle of the prism 111, deg.
$\theta_1$=2D angle of incidence to the first face of the prism 111, deg.
$\theta_2$, $\theta_2'$=internal refraction 2D angles in the prism 111, deg.
$\theta_3$=exit 2D angle of the light beam from the prism 111, deg.
$\theta_4$=entrance 2D angle of the light beam into the configuration 115, deg.
$\theta_5$=refractive 2D angle of the light beam in the configuration 115, deg.
l=distance from the corner of the prism 111 to entry point of the light beam, m
z=distance from reference corner of the prism 111 to exit point of the light beam, m
t=thickness (depth) of the configuration 115, m
L=length of face of the equilateral prism 111, m η =refractive index of material between the prism 111 and the configuration 115,
$\eta_2$=refractive index of material of the configuration 115,
$\eta_3$=refractive index of material behind the configuration 115
d=measure of thickness of the configuration 115, m
From Eqn. (10), the displacement, d, is a function of the thickness, t, of the configuration 115.

For convenience and ease of measurement, two widely separated spectral lines in the Fraunhofer series (486 nm and 656 nm) are chosen for measuring displacement, d. The refractive properties at these specific wavelengths in the visible spectrum are well defined and documented, thus aiding in calculating thickness, t, as a function of displacement, d.

Refer to FIG. 3. In one example, a narrow aperture fiber optic cable 302, such as a cable available from Ocean Optics, Inc., optimized for use in the visible spectrum, is connected to a spectrometer 301, such as an Ocean Optics model USB2000 spectrometer with a special grating optimized to the visible spectrum. Data may be collected manually or, as in experiments done to verify the concept, with a USB cable connected laptop running Ocean Optics, Inc. software associated with the Ocean Optics spectrometer. The software enables display of the spectrum and stores the spectral values in a spreadsheet. The distance, $D_b$, represents a displacement of the fiber optic cable 302 from some known benchmark such as a corner of the prism 111. This distance, $D_b$, may be used to measure the relative lateral displacement between two spectral lines, e.g., R and V as shown in FIG. 3, and thus infer the thickness of the configuration 115 by using Eqn. (10). Further, by passing the fiber optic cable 302 across the entire scale 103, other characteristics of the configuration 115 may be ascertained, e.g., the chemical composition of material in the configuration 115 may be determined by comparison with known optical signatures at given wavelengths.

Figure 4:
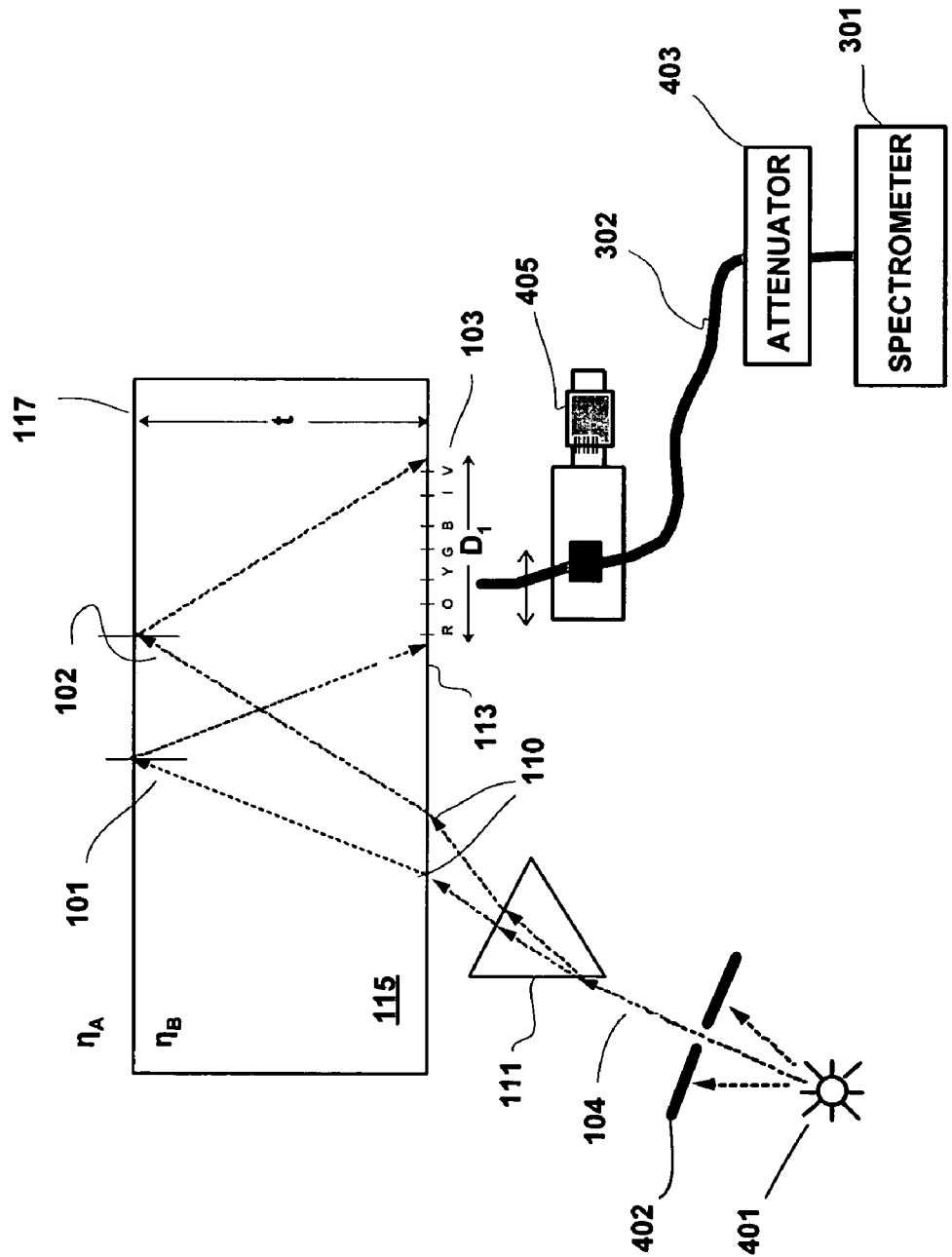
FIG. 4 represents a second alternative embodiment of the present invention as used to exploit relationships shown in FIG. 1.

Refer to FIG. 4. This embodiment of the present invention provides a tunable and calibrated means for sampling the different wavelengths of the reflected signal with some precision. A high intensity light source 401, such as a Dolan-Jenner Industries, Inc., FIBER-LITE™ Model 3100 with a 30-watt quartz-halogen bulb, is used as a white-light source. It is spaced from an optical slit 402, such as any of a variety that may be obtained from Edmund Scientific, inserted between the light source 401 and a prism 111. The slit 402 focuses the light at a pre-specified angle on a surface of the prism 111. A fiber optic cable 302 has a first end disposed at the front surface 103 of the configuration 115 and a second end connected to an optical spectrometer 301. A micrometer slide table 405, also available in a number of models from Edmund Scientific, is connected to the fiber optic cable 302 and is operated to slide the first end of the fiber optic cable 302 laterally along the front surface 113 of the configuration 115. An optical attenuator 403, also available in a number of models from Edmund Scientific, may be needed to adjust the signal for use by the spectrometer 301 and, if so, is inserted between the spectrometer 301 and the fiber optic cable 302 to attenuate the refracted and reflected light 101, 102 from the high intensity light source 401.

Figure 5:
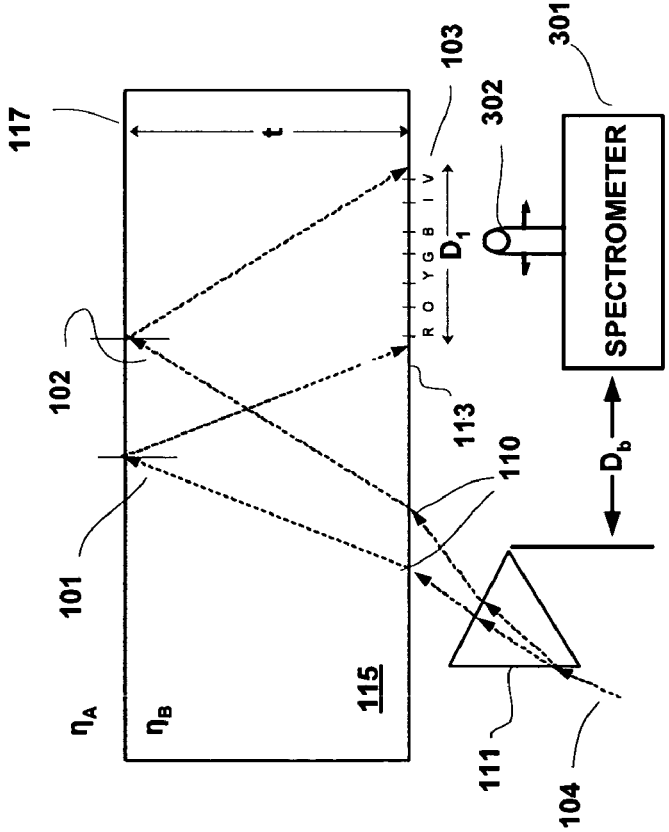
FIG. 5 represents a third alternative embodiment of the present invention as used to exploit relationships shown in FIG. 1.

Refer to FIG. 5. This embodiment differs from the embodiment of FIG. 3 by the substitution of the combination of an intensity sensor 502, such as a broad-spectrum light intensity sensor also available in a number of models from Edmund Scientific, and an optical band-pass filter 501, such as any of a number of monochromatic optical band-pass filter models from Edmund Scientific, for the spectrometer 301. This enables one to determine the position of individual. specific wavelengths along the scale 103. The band-pass filter 501 passes an extremely narrow band of wavelengths. When the filter 501 physically passes over the portion of the spectrum within its band-pass, the sensor 502 registers the presence of energy. For performing thickness measurements, at least two sensors 502 and two band-pass filters 501 operating at uniquely different wavelengths are required to infer thickness.

Figure 6:
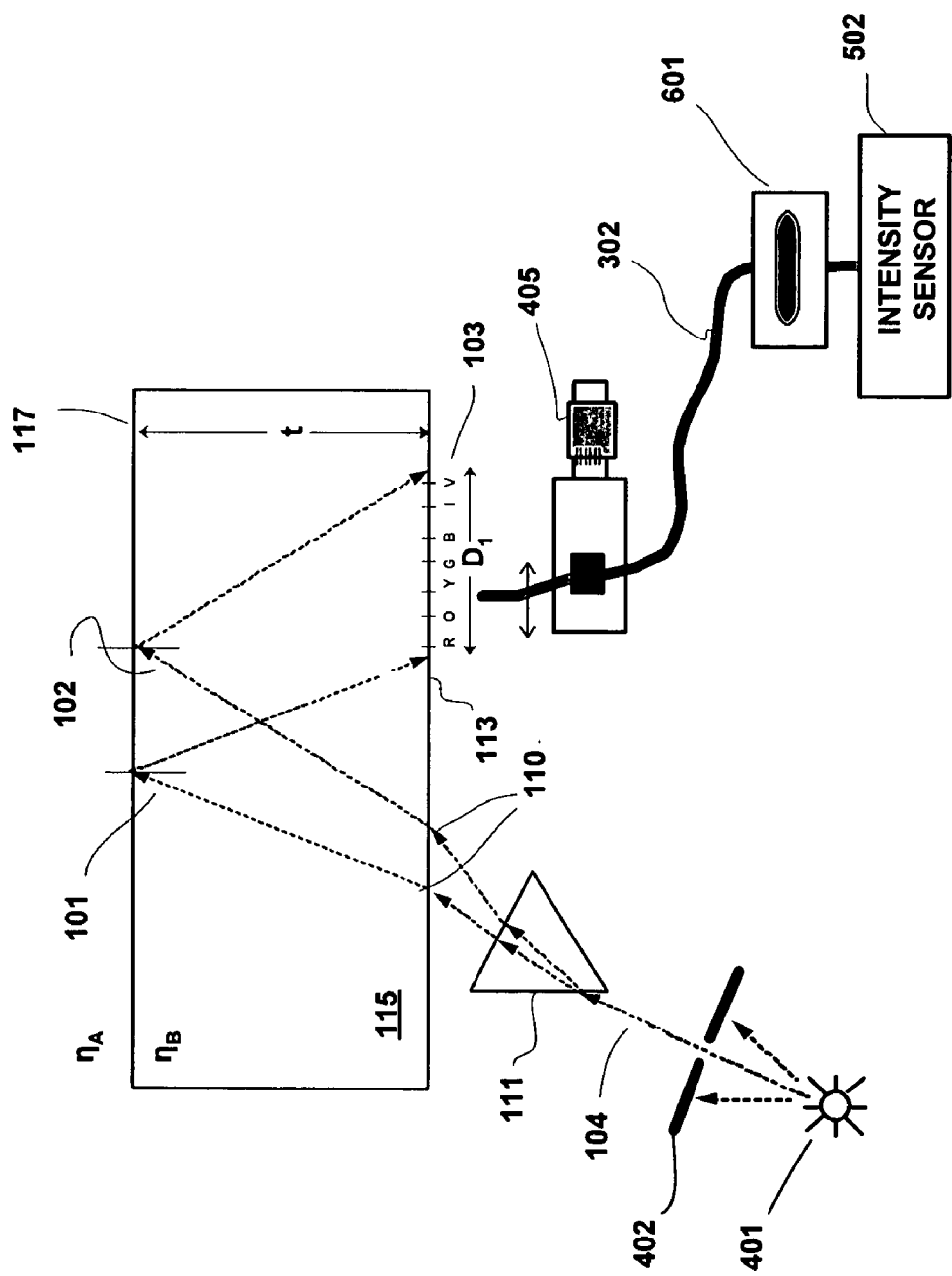
FIG. 6 represents a fourth alternative embodiment of the present invention as used to exploit relationships shown in FIG. 1.

Refer to FIG. 6 illustrating an embodiment of the present invention that differs from the embodiment of FIG. 4 by the substitution of an intensity sensor 502, such as a broad-spectrum light intensity sensor, and a band-pass filter 601, such as a monochromatic optical band-pass filter, for the optical spectrometer 301. This embodiment enables one to determine the position of one specific wavelength in the scale 103. Again, at least two sensors 502 and two unique wavelength band-pass filters 601 are required to infer thickness.

Refer to FIG. 7A. Each one of a pair of fixed-separation stationary fiber optic cables 302 has one end disposed at the front surface 113 of the configuration 115 and the other end connected to a respective input of a combiner 701, such as an optical combiner also available in a number of models from Edmund Scientific. The output of the combiner 701 is connected to a single spectrometer 301. The two refraction/ reflection beams 101, 102 at separate wavelengths (spectral lines) that illuminate the two fixed-separation stationary fiber optic cables 302 are combined and used as input to the spectrometer 301. Thickness of the configuration 115 is inferred by knowing a priori the physical separation of the fiber optic cables 302 along the scale 103.

Refer to FIG. 7B depicting the response of the spectrometer 301 of FIG. 7A to the refracted and reflected beams 101, 102. The difference between the peaks of the signals, $\Delta \lambda$, is proportional to the thickness, t, of the configuration 115. The peaks of the two responses at the separated wavelengths need not be of equal intensity as shown in FIG. 7B.

Refer to FIG. 8A portraying an embodiment of the present invention that differs from the embodiment of FIG. 7 by substituting a trio of fixed-separation fiber optic cables 302 for the pair of fixed-separation fiber optic cables 302 in FIG. 7A, and a combiner 801 having a trio of inputs for the combiner 701 of FIG. 7A. Each one of the trio of fixed-separation stationary fiber optic cables 302 has one end disposed at the front surface 113 of the configuration 115 and the other end connected to a respective input of the combiner 801. The output of the combiner 801 is connected to a single spectrometer 301. The refracted and reflected beams 101, 102, 803 at three different wavelengths (spectral lines) that illuminate the three fixed-separation stationary fiber optic cables 302 are combined and used as input to the spectrometer 301 to infer thickness. Thickness may be determined by determining displacement, d, between any two of the three refracted and reflected beams 101, 102, 803, i.e., either $d_1$ or $d_2$. The trio of fixed-separation stationary fiber optic cables 302 may be used not only to infer a configuration's thickness, t, but also to determine other parameters of the configuration 115, e.g., chemical composition of the material in the configuration 115. The inference may be based on unique spectral signatures presented by the intensity associated with a particular wavelength ($\lambda_1$, $\lambda_2$, and $\lambda_3$) and the relative relationship of intensities ($I_1$, $I_2$, and $I_3$) one to another, as correlated to responses of known material.

Refer to FIG. 8B depicting the response of the spectrometer 301 of FIG. 8A to the refracted and reflected beams 101, 102, 803 at three different wavelengths, $\lambda_1$, $\lambda_2$, and $\lambda_3$, each occurring at a different intensity, $I_1$, $I_2$, and $I_3$, respectively. In addition to taking the difference between any two peaks as in FIG. 7B to determine a measure of thickness, t, the relative differences among the peak intensities ($I_1$, $I_2$, and $I_3$) of the signals, $\Delta I$, may yield additional information on the characteristics of the material comprising the configuration 115. Although shown with three fiber optic cables 302 in FIG. 8A, the concept may be extended to a reasonable number of fiber optic cables 302 and inputs to the combiner 801 depending on what information one needs to determine about the configuration 115.

Although visible white light is used in the figures and examples above, the energy used with embodiments of the present invention may extend to either or both the ultraviolet (UV) and infrared (IR) bands, particularly in light of the fact that certain materials are transmissive to energy in these bands and not to visible light.

Although only a few exemplary embodiments of this invention have been described in detail above, those skilled in the art will readily appreciate that many modifications are possible in the exemplary embodiments without materially departing from the novel teachings and advantages of the invention. For example, since in some applications the spectrometer 301 will be exposed not only to the source of light 104 used to create a spectrum of light of differing wavelengths, but also additionally to background or ambient lighting, adding means to optically or electronically differentiate between the two may be necessary. One method is to chop, or rapidly modulate, the light from the source 104 at a frequency significantly higher than the maximum expected rate of change in intensity of the ambient light. The chopped signal may then be separated electronically from the combined source (chopped) and ambient light. It is therefore to be understood that within the scope of the appended claims, the invention may be practiced otherwise than as described specifically in the above examples.

Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract of the disclosure is provided to comply with the rules requiring an abstract that will allow a searcher to quickly ascertain the subject matter of the technical disclosure of any patent issued from this disclosure. 37 CFR 1.72(b). Any advantages and benefits described may not apply to all embodiments of the invention.

We claim:

1. An apparatus for collecting data to calculate and display at least one parameter of a configuration having at least first and second at least partially transparent surfaces, said first surface approximately parallel to said second surface, comprising:
    means for illuminating said first surface of said configuration with energy, said energy comprising components, each component having at least a unique wavelength, a first said component provided as refraction of said energy from said first surface and a second said component provided as reflection of said energy from said second surface at each of said wavelengths;
    means for collecting said first and second components said means for collecting located near said first surface; and
    means for measuring at least one characteristic of each of said first and second components and determining establishing and displaying at least one relationship between at least one said first component and one said second component of a pair comprising a first said component and a second said component collected at the same time,
    wherein said displaying provides to a user of said apparatus at least one said parameter.

2. The apparatus of claim 1 in which first and second surfaces are approximately flat.

3. The apparatus of claim 1 in which at least one said relationship is the displacement between a said first component and a said second component.

4. The apparatus of claim 1 in which a first said parameter is thickness defined as the distance measured perpendicularly from said first surface to said second surface.

5. The apparatus of claim 1 in which a second said parameter is at least part of the chemical composition of said configuration.

6. The apparatus of claim 1 in which a measured characteristic of said refracted and reflected energy is amplitude.

7. The apparatus of claim 1 in which a measured relationship among said refracted and reflected energy is the distance between peaks of received said first component and said second component.

8. The apparatus of claim 1 in which said energy comprises light, wherein said first component is refracted at said first surface and said second component is reflected at said second surface.

9. The apparatus of claim 8 in which said light comprises a wide continuous band of light.

10. The apparatus of claim 8 in which said light is selected from the group consisting of: light in the visible spectrum, white light, ultraviolet light, infrared light, and combinations thereof.

11. The apparatus of claim 1 in which said illuminating means comprises:
    at least one light source; and
    at least one prism disposed between said light sources and said first surface.

12. The apparatus of claim 11 in which said light source comprises:
    at least one high-intensity white light source; and
    an optical slit disposed between said high-intensity source and said prism,
    wherein said slit focuses light from said high-intensity light source at a pre-specified angle on said prism.

13. The apparatus of claim 11 in which said means for collecting comprises at least one fiber optic cable having a first and second end, said first end disposed near said first surface.

14. The apparatus of claim 13 in which said means for measuring comprises at least one optical spectrometer in, operable communication with said second end of said fiber optic cable,
    wherein said prism is disposed a pre-specified fixed distance from at least one said fiber optic cable.

15. The apparatus of claim 13 in which said means for measuring comprises:
    at least one monochromatic bandpass filter in operable communication with said first ends; and
    at least one optical spectrometer in operable communication with said monochromatic bandpass filters and said second ends,
    wherein said prism is disposed a pre-specified fixed distance from at least one said fiber optic cable.

16. The apparatus of claim 13 in which said means for measuring comprises:
    at least one micrometer slide table in operable communication with said fiber optic cables, wherein operating said slide table only moves said first ends approximately parallel to said first surface;
- at least one optical spectrometer in operable communication with said second ends; and
- at least one optical attenuator inserted between appropriate said first and second ends and in operable communication with said first ends and said spectrometer.

17. The apparatus of claim 13 in which said means for measuring comprises:
- at least one micrometer slide table in operable communication with said fiber optic cables,
wherein operating said slide table only moves said first ends approximately parallel to said first surface;
- at least one light intensity sensor in open-able communication with said second ends; and
- at least one monochromatic band-pass filter inserted between appropriate said intensity sensors and said slide table and in operable communication with said slide table and said intensity sensors.

18. The apparatus of claim 13 in which said means for measuring comprises:
- at least two fiber optic cables maintained at a fixed separation one from another, each said cable having a first and second end, said first ends of each cable disposed near said first surface,
wherein said prism is disposed a pre-specified fixed distance from at least one said fiber optic cable; and
- at least one optical combiner having at least two inputs, each said input in operable communication with a respective said second end; and
- at least one optical spectrometer in operable communication with said combiner.

19. The apparatus of claim 13 in which said means for measuring comprises:
- two fiber optic cables maintained at a fixed separation one from the other, each said cable having a first and second end, said first ends of each cable disposed near said first surface,
- wherein said prism is disposed a pre-specified fixed distance from at least one said fiber optic cable; and
- an optical combiner having two inputs, each said input in operable communication with a respective said second end; and
- an optical spectrometer in operable communication with said combiner.

20. An apparatus for determining at least the thickness of a configuration that is at least semi-transparent to at least one pre-specified type of light and has at least first and second surfaces that are approximately flat and at least approximately parallel one to the other, said thickness defined as the orthogonal distance between said first surface and said second surface, comprising:
- a source comprising at least one light source and at least one prism disposed between said light source and a first surface of said configuration,
wherein said source provides light of at least two unique components, each component having at least a unique wavelength, and
wherein a first of said components is refracted from said first surface and a second of said components is reflected from said second surface of said configuration;
- at least one fiber optic cable disposed near said first surface for collecting said first and second components; and
- at least one optical receiver for measuring said first and second components to determine at least the amplitude and at least one relationship between each said first and second component of at least one pair of said first and second components, said first and second component of said pair of components collected at the same time wherein determining at least said relationship infers at least said thickness.

21. The apparatus of claim 20 in which said optical receiver is selected from the group consisting of: spectrometers, optical spectrometers, intensity sensors, light intensity sensors, and combinations thereof.

22. The apparatus of claim 20 in which at least one said relationship is the lateral displacement between a first said component and a second said component of said pair of components.

23. The apparatus of claim 20 in which said measuring also enables determining at least part of the chemical composition of said configuration.

24. The apparatus of claim 20 in which said light comprises a wide continuous band of light.

25. The apparatus of claim 20 in which said light is selected from the group consisting of: light in the visible spectrum, white light, ultraviolet light, infrared light, and combinations thereof.

26. The apparatus of claim 20 in which said light source comprises:
- at least one high-intensity white light source; and
- at least one optical slit disposed between said high-intensity source and said prism,
wherein said slit focuses light from said high-intensity light source at a pre-specified angle on said prism.

27. The apparatus of claim 20 in which said optical receiver is at least one optical spectrometer in operable communication with said second ends of said fiber optic cables.

28. The apparatus of claim 20 in which said optical receiver comprises:
- at least one monochromatic bandpass filter in operable communication with said first end; and
- at least one optical spectrometer in operable communication with said monochromatic bandpass filter and said second end.

29. The apparatus of claim 20 in which said optical receiver comprises:
- at least one micrometer slide table in operable communication with said fiber optic cables,
wherein operating said slide table only moves said first ends approximately parallel to said first surface;
- at least one optical spectrometer in operable communication with said second end; and
- at least one optical attenuator inserted between said first and second ends of each said fiber optic cable and in operable communication with said first ends and said spectrometers.

30. The apparatus of claim 20 in which said optical receiver comprises:
- at least one micrometer slide table in operable communication with said fiber optic cables,
wherein operating said slide table only moves said first ends approximately parallel to said first surface;
- at least one light intensity sensor in operable communication with said second ends; and
- at least one monochromatic band-pass filter inserted between said intensity sensors and said slide table and in operable communication with said slide table and said intensity sensors.

31. The apparatus of claim 20 in which said optical receiver comprises:
at least two fiber optic cables maintained at a fixed separation one from another, each said cable having a first and second end, said first ends of each cable disposed near said first surface; and
at least one optical combiner having at least two inputs, each said input in operable communication with a respective said second end; and
at least one optical spectrometer in operable communication with said combiner.

32. The apparatus of claim 20 in which said optical receiver comprises:
two fiber optic cables maintained at a fixed separation one from the other, each said cable having a first and second end, said first ends of each cable disposed near said first surface; and
an optical combiner having two inputs, each said input in operable communication with a respective said second end; and
an optical spectrometer in operable communication with said combiner.

33. A method for collecting data to calculate and display the thickness of a configuration that is at least semi-transparent to pre-specified types of energy, said configuration having at least first and second surfaces that are approximately flat and parallel one to the other, said thickness defined as the orthogonal distance between said first surface and said second surface, comprising:
illuminating said first surface with at least one said pre-specified type of energy, said energy provided at said first surface in at least two unique measurable components thereof, a first said component provided as refraction of said energy from said first surface and a second said component provided as reflection of said energy from said second surface; and
measuring near said first surface at least lateral displacement between said first component and said second component of a pair of said components collected simultaneously; and
calculating said thickness using said measure of said lateral displacement; and displaying said calculation of said thickness for use by at least one user.

34. The method of claim 33 illuminating said first surface with said energy, said energy comprising light in which said components each have a unique wavelength, said components obtained by passing said light through at least one prism prior to illuminating said first surface.

35. The method of claim 34 in which illuminating said first surface is done with at least two components of light in the visible spectrum.

36. The method of claim 35, said measuring further comprising:
providing at least one fiber optic cable having first and second ends;
positioning said first end near said first surface;
providing an optical spectrometer in operable communication with said second end; and
moving said first end laterally along said first surface,
wherein said moving enables collection of at least one pair of first and second components, and employing said spectrometer to determine at least the lateral displacement between at least one of said first components and one of said second components in said pair.

37. The method of claim 36 further comprising:
conducting said illuminating with at least one high-intensity light source directed toward at least one slit disposed between said high-intensity source and said prism;
illuminating said slit with light from said high-intensity source;
providing at least one micrometer slide table in operable communication with said fiber optic cable,
moving said first end approximately parallel to said first surface via said slide table; and
providing at least one optical attenuator in operable communication with said first end and said optical spectrometer.

38. The method of claim 36, further comprising:
providing at least two fiber optic cables, each having first and second ends,
wherein each said fiber optic cable is fixed in position relative to any other
positioning said first ends near said first surface;
providing an optical combiner in operable communication with said second ends and said optical spectrometer, and
providing outputs from said combiner to said spectrometer.

39. The method of claim 35 further comprising:
conducting said illuminating with at least one high-intensity light source directed toward at least one slit disposed between said high-intensity source and said prism;
illuminating said slit with light from said high-intensity source;
providing at least one fiber optic cable having first and second ends;
positioning said first ends near said first surface;
providing at least one micrometer slide table in operable communication with said fiber optic cables;
moving said first ends approximately parallel to said first surface via said slide table,
wherein said moving enables collection of at least one said pair of first and second components;
providing at least one intensity sensor in operable communication with said second ends;
employing said intensity sensors to determine at least the lateral displacement between one said first component and one said second component in each said pair; and
providing at least one monochromatic optical bandpass filter in operable communication with said first ends and said intensity sensors.

40. The method of claim 35 further comprising:
providing at least one fiber optic cable having first and second ends;
positioning said first end near said first surface;
providing an intensity sensor in operable communication with said first and second ends;
moving said first end approximately parallel to said first surface,
wherein said moving enables collection of at least two one said pair of first and second components, and
employing said intensity sensors to determine lateral distance between one said first component and one said second component of each said pair.

* * * * *